US010701159B2

(12) United States Patent
Xue et al.

(10) Patent No.: US 10,701,159 B2
(45) Date of Patent: Jun. 30, 2020

(54) METHOD AND APPARATUS FOR IMPLEMENTING DEVICE SHARING

(71) Applicant: Huawei Technologies Co., Ltd., Shenzhen (CN)

(72) Inventors: Dongliang Xue, Beijing (CN); Xinlong Lin, Beijing (CN); Jianfeng Zhan, Beijing (CN); Yunwei Gao, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 263 days.

(21) Appl. No.: 15/186,168

(22) Filed: Jun. 17, 2016

(65) Prior Publication Data
US 2016/0301759 A1 Oct. 13, 2016

Related U.S. Application Data

(63) Continuation of application No. PCT/CN2014/094030, filed on Dec. 17, 2014.

(30) Foreign Application Priority Data

Dec. 17, 2013 (CN) .......................... 2013 1 0695520

(51) Int. Cl.
*G06F 3/00* (2006.01)
*G06F 1/00* (2006.01)
(Continued)

(52) U.S. Cl.
CPC ........ *H04L 67/146* (2013.01); *H04L 12/6418* (2013.01); *H04L 67/1097* (2013.01)

(58) Field of Classification Search
CPC ............... H04L 12/6418; H04L 67/146; H04L 67/1097
(Continued)

(56) References Cited

U.S. PATENT DOCUMENTS 6,779,004 B1 * 8/2004 Zintel ................. H04L 12/2803
709/227
6,842,906 B1 * 1/2005 Bowman-Amuah ... G06F 9/465
718/104
(Continued)

FOREIGN PATENT DOCUMENTS

CN 1327198 A 12/2001
CN 1664798 A 9/2005
(Continued)

OTHER PUBLICATIONS

Hou et al., "Cost Effective Data Center Servers," IEEE 19th International Symposium on High Performance Computer Architecture (HPCA), pp. 179-187, Institute of Electronic and Electrical Engineers, New York, New York (Feb. 23-27, 2013).

Primary Examiner — Kevin T Bates
Assistant Examiner — Golam Mahmud
(74) Attorney, Agent, or Firm — Leydig, Voit & Mayer, Ltd.

(57) ABSTRACT

A method and an apparatus for implementing device sharing, which are applied to a local system in a heterogeneous system that includes the local system and a peer system, where the peer system have a peripheral device. The method executed by the local system includes: acquiring identifier information of a peripheral device of the peer system; generating according to the acquired identifier information and according to a message format that can be locally identified, an operation request against the peripheral device managed by the peer system; and parsing out from the operation request, a request message including a parameter
(Continued)

necessary to generate the operation request, and notifying the peer system of the request message. According to the method, the local system can access a peripheral device of the peer system, thereby implementing peripheral device sharing in the heterogeneous system.

20 Claims, 9 Drawing Sheets

(51) Int. Cl.
    *H04L 29/08*     (2006.01)
    *H04L 12/64*     (2006.01)

(58) Field of Classification Search
    USPC .......................................... 709/212
    See application file for complete search history.

(56) References Cited

U.S. PATENT DOCUMENTS

| | | | |
|---|---|---|---|
| 7,093,080 | B2 | 8/2006 | Day et al. |
| 7,136,927 | B2* | 11/2006 | Traversat ............... G06F 9/4416 |
| | | | 709/230 |
| 7,657,597 | B2* | 2/2010 | Arora ...................... H04L 51/04 |
| | | | 707/830 |
| 8,571,882 | B1* | 10/2013 | Teitelbaum ............. G06F 16/27 |
| | | | 705/2 |
| 8,683,040 | B2* | 3/2014 | Kammerer .......... H04L 63/0407 |
| | | | 709/225 |
| 9,032,025 | B2* | 5/2015 | Vieira ................... H04L 67/104 |
| | | | 709/204 |
| 9,652,388 | B2* | 5/2017 | Shanbhogue ....... G06F 12/0808 |
| 9,860,348 | B2* | 1/2018 | Eisner ..................... G06F 9/546 |
| 9,888,062 | B2* | 2/2018 | Kim ..................... H04L 67/125 |
| 2002/0087483 | A1* | 7/2002 | Harif ..................... G06Q 20/02 |
| | | | 705/76 |
| 2002/0107934 | A1* | 8/2002 | Lowery ................ H04L 67/104 |
| | | | 709/213 |
| 2003/0188060 | A1 | 10/2003 | Van Hensbergen |
| 2005/0097280 | A1* | 5/2005 | Hofstee ............... G06F 13/1652 |
| | | | 711/148 |
| 2009/0024746 | A1 | 1/2009 | Welch |
| 2009/0055669 | A1* | 2/2009 | Pang ..................... G06F 1/3215 |
| | | | 713/322 |
| 2009/0327900 | A1* | 12/2009 | Noll ........................ G06F 9/468 |
| | | | 715/733 |
| 2010/0135296 | A1* | 6/2010 | Hwang. .............. H04L 12/1836 |
| | | | 370/390 |
| 2010/0198767 | A1* | 8/2010 | Farrelly ............ G06F 17/30053 |
| | | | 706/46 |
| 2011/0047266 | A1 | 2/2011 | Yu et al. |
| 2011/0219151 | A1* | 9/2011 | Coile ...................... G06F 21/73 |
| | | | 710/30 |
| 2012/0030433 | A1* | 2/2012 | Zhang ................... G06F 1/3293 |
| | | | 711/147 |
| 2012/0054508 | A1* | 3/2012 | Chen ....................... H04L 12/00 |
| | | | 713/300 |
| 2013/0061240 | A1 | 3/2013 | Yan et al. |
| 2013/0318384 | A1* | 11/2013 | Yoshihara ............ G06F 1/3296 |
| | | | 713/323 |
| 2014/0032620 | A1 | 1/2014 | Tapie et al. |

FOREIGN PATENT DOCUMENTS

| | | |
|---|---|---|
| CN | 1829215 A | 9/2006 |
| CN | 101132378 A | 2/2008 |
| CN | 101465783 A | 6/2009 |
| CN | 101546301 A | 9/2009 |
| CN | 101697225 A | 4/2010 |
| CN | 101901207 A | 12/2010 |
| CN | 101957865 A | 1/2011 |
| CN | 102474910 A | 5/2012 |
| CN | 102741828 A | 10/2012 |
| CN | 102955737 A | 3/2013 |
| CN | 103348347 A | 10/2013 |
| EP | 1164480 A2 | 12/2001 |
| EP | 2056556 A1 | 5/2009 |
| EP | 2506150 A1 | 10/2012 |

\* cited by examiner

METHOD AND APPARATUS FOR IMPLEMENTING DEVICE SHARING

CROSS-REFERENCE TO RELATED APPLICATION

This application is a continuation of International Application No. PCT/CN2014/094030, filed on Dec. 17, 2014, which claims priority to Chinese Patent Application No. 201310695520.4, filed on Dec. 17, 2013, both of which are hereby incorporated by reference in their entireties.

TECHNICAL FIELD

The present disclosure relates to the field of heterogeneous system technologies, and in particular, to a method and an apparatus for implementing device sharing.

BACKGROUND

As cloud computing technologies develop, a big data era requiring massive data processing has come. In order to meet parallelization and diversification trends of applications and an urgent desire of corresponding industries for reducing energy consumption, a heterogeneous system becomes a new research hotspot.

The heterogeneous system refers to a system obtained by interconnecting, in various manners, two systems including different processors. For example, one system includes an X86 processor, and the other system includes an ARM processor. Each system in the heterogeneous system not only includes a processor, but also includes a memory and a peripheral device that are independent from each other. Because the heterogeneous system has features of a high computing capability, a rich hardware resource, and close coupling, when the heterogeneous system is used to execute applications with different characteristics, a hardware advantage of the heterogeneous system can be brought into full play. Therefore, energy consumption of the heterogeneous system can be effectively reduced and a performance ratio can be improved. For example, there are two computing tasks, and the two computing tasks interact with each other relatively frequently, where one computing task is relatively complex (which needs to be run on an X86 processor), and the other computing task is relatively simple (which may be run on an X86 processor or on an ARM processor). If there is no heterogeneous system, two X86 processors are required to complete the two computing tasks. If there is a heterogeneous system, the heterogeneous system with X86+ARM processors may be used to complete the two computing tasks, where the complex computing task is run on the X86 processor, and the simple task is run on the ARM processor. Power consumption of the ARM processor is much lower than that of the X86 processor, and therefore, using the heterogeneous system reduces the energy consumption of the heterogeneous system effectively and improves the performance ratio.

As PCI Express technologies develop continuously, people begin to use a non-transparent bridge (NTB) in a PCIe-switch to interconnect two systems in a heterogeneous system. In a process of implementing the present disclosure, the inventor finds that: in the prior art, only memory sharing in a heterogeneous system can be implemented, where the so-called "memory sharing" refers to that two systems in the heterogeneous system not only can access a memory of a local system, but also can access a memory of a peer system. However, currently, sharing peripheral device cannot be implemented in the heterogeneous system in the prior art, in other words, the two systems in the heterogeneous system can access only a peripheral device of the local system, but cannot access a peripheral device of the peer system.

SUMMARY

In view of this, the present disclosure provides a method and an apparatus for implementing device sharing, so as to resolve a problem in the prior art that two subsystems in a heterogeneous system can access only a peripheral device of a local subsystem, but cannot access a peripheral device of a peer subsystem; technical solutions are as follows:

According to a first aspect, a method for implementing device sharing is provided, where the method is applied to a local system in a heterogeneous system that includes the local system and a peer system, the local system and the peer system have processors and peripheral devices that are independent from each other, and a processor in the local system and a processor in the peer system use different instruction sets; and the method includes:

acquiring, by the local system, identifier information of a peripheral device of the peer system;

generating, by the local system according to the acquired identifier information of the peripheral device and according to a message format that can be locally identified, an operation request against the peripheral device managed by the peer system; and parsing out, by the local system from the operation request, a request message including a parameter necessary to generate the operation request, and notifying the peer system of the request message that is parsed out.

In a first possible implementation manner of the first aspect, the method for implementing device sharing further includes:

acquiring a feedback message of the request message, where the feedback message includes a parameter necessary to generate an execution result of the operation request; and parsing, according to the parameter in the feedback message, the feedback message into a message format that can be locally identified by the local system.

With reference to the first possible implementation manner of the first aspect, in a second possible implementation manner of the first aspect, a memory managed by the peer system includes a first memory shared with the local system, where an abstract device table including device information of the peripheral device managed by the peer system and a device status table including device domain information of the peripheral device managed by the peer system are prestored in the first memory; and the acquiring, by the local system, identifier information of a peripheral device of the peer system includes:

prereading, by the local system, the abstract device table and the device status table of the peer system that are in the first memory;

combining the abstract device table of the peer device with an abstract device table of the local system, and combining the device status table of the peer device with a device status table of the local system;

storing a combined abstract device table and a combined device status table in a memory of the local system; and acquiring the identifier information of the peripheral device of the peer system from the combined abstract device table according to device domain information in the combined device status table.

With reference to the first possible implementation manner of the first aspect, in a third possible implementation manner of the first aspect, a memory managed by the peer system includes a first memory shared with the local system, where an abstract device table including device information of the peripheral device managed by the peer system is prestored in the first memory, the device information of the peripheral device includes at least the identifier information of the peripheral device, and the identifier information of the peripheral device includes at least a device name of the peripheral device; and the acquiring, by the local system, identifier information of a peripheral device of the peer system includes:

prereading, by the local system, the abstract device table of the peer system in the first memory;

comparing the abstract device table of the peer system with an abstract device table of the local system, searching the abstract device table of the peer system for device information of a peripheral device whose device name is different from a device name in the abstract device table of the local system, and using the searched device information of the peripheral device as device information of an exclusive peripheral device of the peer system;

deleting device information of the peripheral device in the abstract device table of the peer system except the device information of the exclusive peripheral device of the peer system, to obtain an abstract device table including the device information of the exclusive peripheral device of the peer system;

storing, in a memory of the local system, the abstract device table including the device information of the exclusive peripheral device of the peer system; and acquiring the identifier information of the peripheral device of the peer system from the abstract device table including the device information of the exclusive peripheral device of the peer system.

With reference to the second possible implementation manner of the first aspect or the third possible implementation manner of the first aspect, in a fourth possible implementation manner of the first aspect, the acquiring a feedback message of the request message includes:

acquiring the feedback message of the request message from the first memory of the peer system.

With reference to the first aspect, the first possible implementation manner of the first aspect, the second possible implementation manner of the first aspect, or the third possible implementation manner of the first aspect, in a fifth possible implementation manner of the first aspect, the device status table further includes device use status information, where the device use status information is used to indicate whether the peripheral device in the abstract device table is in an idle state or in an occupied state;

before the generating, by the local system according to the acquired identifier information of the peripheral device and according to a message format that can be locally identified, an operation request against the peripheral device managed by the peer system, the method further includes:

querying, by the local system, the device status table to query whether a state of the peripheral device managed by the peer system is idleness; and the generating, by the local system according to the acquired identifier information of the peripheral device and according to a message format that can be locally identified, an operation request against the peripheral device managed by the peer system is specifically:

when it is queried that the state of the peripheral device managed by the peer system is idleness, generating, by the local system, the operation request against the peripheral device managed by the peer system.

With reference to the first aspect, the first possible implementation manner of the first aspect, the second possible implementation manner of the first aspect, or the third possible implementation manner of the first aspect, in a sixth possible implementation manner of the first aspect, the memory managed by the local system includes a second memory shared with the peer system; and the notifying the peer system of the request message that is parsed out includes:

storing, in the second memory by the local system, the request message that is parsed out; and sending, to the peer system, a request for reading the request message, so that the peer system reads the request message from the second memory.

With reference to the first aspect, the first possible implementation manner of the first aspect, the second possible implementation manner of the first aspect, or the third possible implementation manner of the first aspect, in a seventh possible implementation manner of the first aspect, the memory managed by the local system includes a second memory shared with the peer system; and the notifying the peer system of the request message that is parsed out includes:

storing, in the second memory by the local system, the request message that is parsed out, so that the peer system discovers the request message in a manner of polling the second memory and reads the request message from the second memory after discovering the request message.

With reference to the second possible implementation manner of the first aspect or the third possible implementation manner of the first aspect, in an eighth possible implementation manner of the first aspect, the abstract device table is set in a user mode of the peer system.

With reference to the first possible implementation manner of the first aspect, the second possible implementation manner of the first aspect, or the third possible implementation manner of the first aspect, in a ninth possible implementation manner of the first aspect, the parameter necessary to generate the operation request includes at least the identifier information of the peripheral device, target data, and requested content, where the target data is to-be-operated data corresponding to the peripheral device identified by the identifier information of the peripheral device, and the requested content is used to indicate an operation performed on the target data; and the parameter necessary to generate the execution result of the operation request includes at least the identifier information of the peripheral device and operation result data corresponding to the target data.

According to a second aspect, an apparatus for implementing device sharing is provided, where the apparatus is applied to a local system in a heterogeneous system that includes the local system and a peer system, the local system and the peer system have processors and peripheral devices that are independent from each other, and a processor in the local system and a processor in the peer system use different instruction sets; and the apparatus includes:

an information acquiring module, configured to acquire identifier information of a peripheral device of the peer system;

an operation request generation module, configured to generate, according to the identifier information of the peripheral device acquired by the information acquiring module and according to a message format that can be locally identified, an operation request against the peripheral device managed by the peer system;

an operation request parsing module, configured to parse out, from the operation request generated by the operation request generation module, a request message including a parameter necessary to generate the operation request; and a message notification module, configured to notify the peer system of the request message that is parsed out by the operation request parsing module.

In a first possible implementation manner of the second aspect, the apparatus for implementing device sharing further includes:

a feedback message acquiring module, configured to acquire a feedback message of the request message, where the feedback message includes a parameter necessary to generate an execution result of the operation request; and a feedback message parsing module, configured to parse, according to the parameter in the feedback message, the feedback message into a message format that can be locally identified by the local system.

With reference to the first possible implementation manner of the second aspect, in a second possible implementation manner of the second aspect, a memory managed by the peer system includes a first memory shared with the local system, where an abstract device table including device information of the peripheral device managed by the peer system and a device status table including device domain information of the peripheral device managed by the peer system are prestored in the first memory; and the information acquiring module includes:

an information reading submodule, configured to preread the abstract device table and the device status table of the peer system that are in the first memory;

an information combining submodule, configured to combine the abstract device table of the peer device with an abstract device table of the local system, and combine the device status table of the peer device with a device status table of the local system;

an information storage submodule, configured to store a combined abstract device table and a combined device status table in a memory of the local system; and an information acquiring submodule, configured to acquire the identifier information of the peripheral device of the peer system from the combined abstract device table according to device domain information in the combined device status table.

With reference to the first possible implementation manner of the second aspect, in a third possible implementation manner of the second aspect, a memory managed by the peer system includes a first memory shared with the local system, where an abstract device table including device information of the peripheral device managed by the peer system is prestored in the first memory, the device information of the peripheral device includes at least the identifier information of the peripheral device, and the identifier information of the peripheral device includes at least a device name of the peripheral device; and the information acquiring module includes:

an information reading submodule, configured to read the abstract device table of the peer system in the first memory;

an information searching submodule, configured to compare the abstract device table of the peer system with an abstract device table of the local system, search the abstract device table of the peer system for device information of a peripheral device whose device name is different from a device name in the abstract device table of the local system, and use the searched device information of the peripheral device as device information of an exclusive peripheral device of the peer system;

an information deletion submodule, configured to delete device information of the peripheral device in the abstract device table of the peer system except the device information of the exclusive peripheral device of the peer system, to obtain an abstract device table including the device information of the exclusive peripheral device of the peer system;

an information storage submodule, configured to store, in a memory of the local system, the abstract device table including the device information of the exclusive peripheral device of the peer system; and an information acquiring submodule, configured to acquire the identifier information of the peripheral device of the peer system from the abstract device table including the device information of the exclusive peripheral device of the peer system.

With reference to the second possible implementation manner of the second aspect or the third possible implementation manner of the second aspect, in a fourth possible implementation manner of the second aspect, the feedback message acquiring module is specifically configured to include: acquiring the feedback message of the request message from the first memory of the peer system.

With reference to the second aspect, the first possible implementation manner of the second aspect, the second possible implementation manner of the second aspect, or the third possible implementation manner of the second aspect, in a fifth possible implementation manner of the second aspect, the device status table further includes device use status information, where the device use status information is used to indicate whether the peripheral device in the abstract device table is in an idle state or in an occupied state;

the apparatus further includes:

a status query module, configured to: before the operation request generation module generates, according to the identifier information of the peripheral device acquired by the information acquiring module and according to the message format that can be locally identified, the operation request against the peripheral device managed by the peer system, query the device status table to query whether a state of the peripheral device managed by the peer system is idleness; and the operation request generation module is specifically configured to: when it is queried that the state of the peripheral device managed by the peer system is idleness, generate, by the local system, the operation request against the peripheral device managed by the peer system.

With reference to the second aspect, the first possible implementation manner of the second aspect, the second possible implementation manner of the second aspect, or the third possible implementation manner of the second aspect, in a sixth possible implementation manner of the second aspect, the memory managed by the local system includes a second memory shared with the peer system; and the message notification module is specifically configured to: store, in the second memory, the request message that is parsed out, and send, to the peer system, a request for reading the request message, so that the peer system reads the request message from the second memory.

With reference to the second aspect, the first possible implementation manner of the second aspect, the second possible implementation manner of the second aspect, or the third possible implementation manner of the second aspect, in a seventh possible implementation manner of the second aspect, the memory managed by the local system includes a second memory shared with the peer system; and the message notification module is specifically configured to store, in the first memory, the request message that is parsed out, so that the peer system discovers the request message in a manner of polling the second memory and reads the request message from the second memory after discovering the request message.

With reference to the second possible implementation manner of the second aspect or the third possible implementation manner of the second aspect, in an eighth possible implementation manner of the second aspect, the abstract device table is set in a user mode of the peer system.

With reference to the first possible implementation manner of the second aspect, the second possible implementation manner of the second aspect, or the third possible implementation manner of the second aspect, in a ninth possible implementation manner of the second aspect, the parameter necessary to generate the operation request includes at least the identifier information of the peripheral device, target data, and requested content, where the target data is to-be-operated data corresponding to the peripheral device identified by the identifier information of the peripheral device, and the requested content is used to indicate an operation performed on the target data; and the parameter necessary to generate the execution result of the operation request includes at least the identifier information of the peripheral device and operation result data corresponding to the target data.

The foregoing technical solutions have the following beneficial effects:

Because a local system and a peer system in a heterogeneous system are heterogeneous, a manner of accessing a peripheral device of the local system is different from a manner of accessing a peripheral device of the peer system; therefore, the local system can access only the peripheral device at a local end, but cannot access the peripheral device of the peer system, namely, peripheral device sharing cannot be implemented. Based on this point, in order to implement peripheral device sharing, according to the method and the apparatus for implementing device sharing that are provided in the present disclosure, after identifier information of a peripheral device of a peer system is acquired, an operation request against the peripheral device managed by the peer system is first generated according to the identifier information of the peripheral device and according to a message format that can be locally identified, then a request message including a parameter necessary to generate the operation request is parsed out from the operation request, and finally, the peer system is notified of the request message that is parsed out. In this way, the peer system can generate, according to the request message, an operation request in a message format that can be identified by the peer system, so as to trigger the peer system to operate its own peripheral device. It can be seen that according to the method and the apparatus for implementing device sharing provided in the embodiments of the present disclosure, two systems in a heterogeneous system not only can access a peripheral device of a local system, but also can access a peripheral device of a peer system, in other words, peripheral device sharing is implemented in the heterogeneous system.

BRIEF DESCRIPTION OF DRAWINGS

To describe the technical solutions in the embodiments of the present disclosure more clearly, the following briefly introduces the accompanying drawings required for describing the embodiments or the prior art. Apparently, the accompanying drawings in the following description show merely the embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. Apparently, the described embodiments are merely some but not all of the embodiments of the present disclosure. All other embodiments obtained by a person of ordinary skill in the art based on the embodiments of the present disclosure shall fall within the protection scope of the present disclosure.

Because a local system and a peer system in a heterogeneous system are heterogeneous, a manner of accessing a peripheral device of the local system is different from a manner of accessing a peripheral device of the peer system. For example, the peripheral device of the local system in the heterogeneous system includes a1 and a2, and the peripheral device of the peer system includes b1, b2, and b3; a manner for the local system to access the peripheral device a1 is different from that of accessing the peripheral device b1. Specifically, when accessing the peripheral device a1, the local system generates an operation request against the peripheral device according to a message format that can be locally identified. When the local system accesses the peripheral device b1 of the peer system, if the local system generates an operation request against the peripheral device according to the message format that can be locally identified, the operation request against the peripheral device cannot be identified by the peer system. As a result, the local system can access only the peripheral device at a local end, but cannot access the peripheral device of the peer system, in other words, sharing the peripheral device is not implemented. Based on this point, the embodiments of the present disclosure provide a method for implementing device sharing, where one of main ideas of the method includes: acquiring, by a local system, identifier information of a peripheral device of a peer system; generating, according to the acquired identifier information of the peripheral device and according to a message format that can be locally identified, an operation request against the peripheral device managed by the peer system; and parsing out, from the operation request, a request message including a parameter necessary to generate the operation request, and notifying the peer system of the request message that is parsed out.

Figure 1:
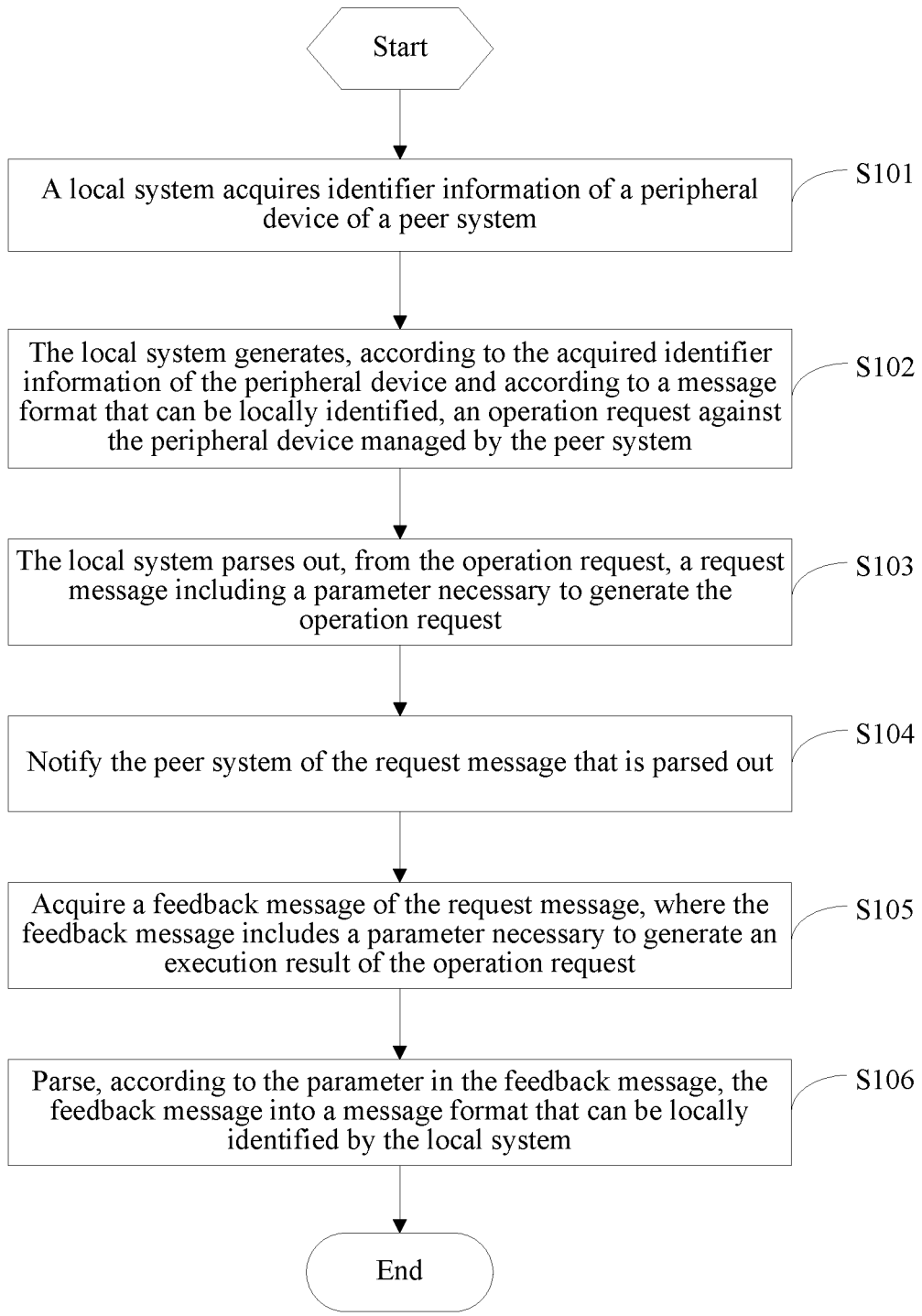
FIG. 1 is a schematic flowchart of a method for implementing device sharing according to an embodiment of the present disclosure.

Referring to FIG. 1, FIG. 1 is a schematic flowchart of a method for implementing device sharing according to an embodiment of the present disclosure, where the method is applied to a local system in a heterogeneous system that includes the local system and a peer system, the local system and the peer system have processors and peripheral devices that are independent from each other, a processor in the local system and a processor in the peer system use different instruction sets, and the method may include the following steps:

Step S101: The local system acquires identifier information of a peripheral device of the peer system.

The identifier information of the peripheral device may include a name of the peripheral device and a device ID of the peripheral device.

The local system and the peer system in the heterogeneous system generally use an NTB for interconnection. The NTB is a "non-transparent bridge". As the name implies, a system at one end of the non-transparent bridge is non-transparent to a system at the other end. Specifically, the local system cannot discover a peripheral device of the peer system. In other words, the local system does not know which peripheral devices the peer system has. In order to acquire device information of a peripheral device at a peer end, in this embodiment of the present disclosure, a memory sharing technology is used, so that the local system obtains the device information of the peripheral device of the peer system.

Specifically, a memory managed by the peer system includes a first memory shared with the local system, where an abstract device table including the device information of the peripheral device managed by the peer system and a device status table including device domain information of the peripheral device managed by the peer system are prestored in the first memory. The first memory is a memory allocated by the peer system to the local system, and the local system has a right to use the first memory. Because the local system has the right to use the first memory, the first memory is equivalent to a memory of the local system, and the local system can directly read information in the first memory.

For the abstract device table of the device information of the peripheral device managed by the peer system, in a possible implementation manner, the abstract device table may be set in a kernel mode of the peer system. Specifically, an operating system of the peer system imitates a sysfs file system to construct the abstract device table of the peer system in kernel space, or directly uses a created sysfs file system as the abstract device table of the peer system. In another possible implementation manner, the abstract device table of the device information of the peripheral device managed by the peer system may be set in a user mode of the peer system. Specifically, an operating system of the peer system imitates a sysfs file system to construct the abstract device table of the peer system in kernel space, or directly uses a created sysfs file system as the abstract device table of the peer system, and then places the abstract device table in the kernel mode to the user mode. The operating system of the peer system also scans the sysfs file system to fill in a device status table including at least device identifier information and device domain information.

Likewise, in order for the peer system to share a peripheral device of the local system, the memory managed by the local system includes a second memory shared with the peer system. An abstract device table and a device status table of the local system may be stored in the second memory for use when the peer system shares the peripheral device of the local system. It should be understood that an implementation manner of sharing, by the peer system, the peripheral device of the local system is the same as an implementation manner of sharing, by the local system, the peripheral device of the peer system, and details are not described in this embodiment of the present disclosure again.

It should be noted that when the peer system starts or hot plugging for a peripheral device is performed on the peripheral device managed by the peer system, the abstract device table and the device status table in the first memory are updated.

In addition, it should be noted that the local system and the peer system are connected by using the non-transparent bridge, and a mapping relationship between the first memory of the peer system and the local system is established by preconfiguring a register of the non-transparent bridge, so that the local system can access the first memory of the peer system by using the mapping relationship.

Figure 2:
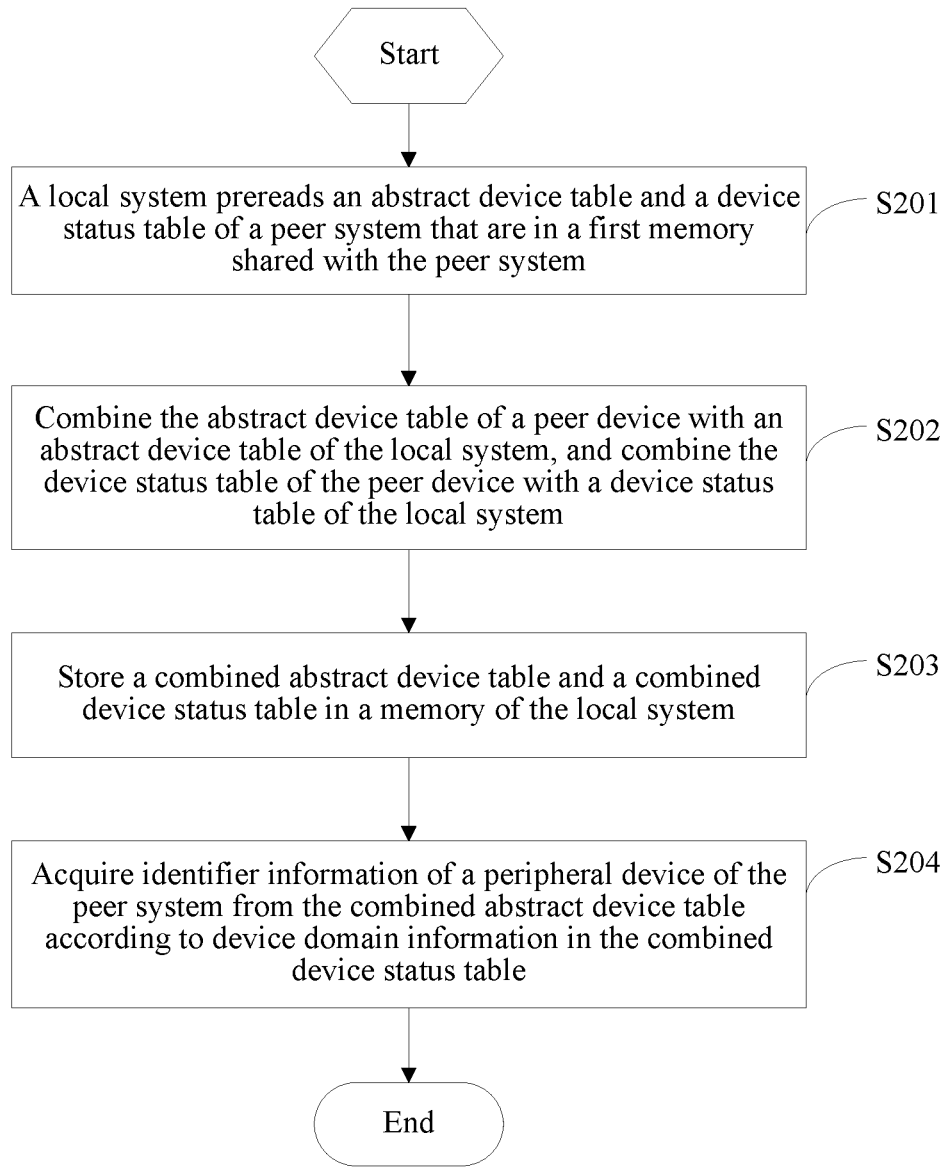
FIG. 2 is a schematic flowchart of a possible implementation manner, of acquiring identifier information of a peripheral device of a peer system by a local system, of a method for implementing device sharing according to an embodiment of the present disclosure.

Referring to FIG. 2, FIG. 2 is a schematic flowchart of a possible implementation manner, of acquiring the identifier information of the peripheral device of the peer system by the local system, in the method for implementing device sharing provided in this embodiment of the present disclosure, where the method may include the following steps:

Step S201: The local system prereads the abstract device table and the device status table of the peer system that are in the first memory shared with the peer system.

The device status table is shown in the following table:

| Device name | Device ID | Device domain |
| --- | --- | --- |

Step S202: Combine the abstract device table of a peer device with an abstract device table of the local system, and combine the device status table of the peer device with a device status table of the local system.

Step S203: Store a combined abstract device table and a combined device status table in a memory of the local system.

Step S204: Acquire the identifier information of the peripheral device of the peer system from the combined abstract device table according to device domain information in the combined device status table.

Specifically, device information of a peripheral device in the combined device status table not only includes device information of a peripheral device at a local end, but also includes device information of a peripheral device at a peer end. Therefore, when the identifier information of the peripheral device at the peer end is extracted from the combined abstract device table, it is needed to determine, by using the device domain information in the device status table, which device information in the abstract device table is information about the peripheral device of the peer system, so as to acquire the identifier information of the peripheral device at the peer end.

After the identifier information of the peripheral device of the peer system is acquired, return to the procedure of the method for implementing device sharing.

Step S102: The local system generates, according to the acquired identifier information of the peripheral device and according to a message format that can be locally identified, an operation request against the peripheral device managed by the peer system.

Step S103: The local system parses out, from the operation request, a request message including a parameter necessary to generate the operation request.

The parameter necessary to generate the operation request includes at least the identifier information of the peripheral device, target data, and requested content. The target data is to-be-operated data corresponding to the peripheral device identified by the identifier information of the peripheral device, and the requested content is used to indicate an operation performed on the target data. In addition, the parameter request message may further include message type information and check information, where the message type information is used to indicate a type of the message (a request message or a response message), and a check message is used to check whether the message is a valid message. A format of the parameter request message is as follows:

| Device name | Device ID | Requested content | Request/Response information | Target data | Check information |
| --- | --- | --- | --- | --- | --- |

Step S104: The local system notifies the peer system of the request message that is parsed out.

In this embodiment, the memory managed by the local system includes the second memory shared with the peer system. The second memory is a memory allocated by the local system at the local end to the peer system, and the peer system has a right to use the second memory. Because the peer system has the right to use the second memory, the second memory is equivalent to a memory of the peer system, and the peer system can directly read information in the second memory.

In a possible implementation manner, that the local system notifies the peer system of the request message that is parsed out is specifically: storing, in the second memory by the local system, the request message that is parsed out, and sending, to the peer system, a request for reading the request message, so that the peer system reads the request message from the second memory.

In another possible implementation manner, that the local system notifies the peer system of the request message that is parsed out is specifically: storing, in the second memory by the local system, the request message that is parsed out, so that the peer system discovers the request message in a manner of polling the second memory and reads the request message from the second memory after discovering the request message.

It should be noted that after acquiring the request message, the peer system generates, according to the request message and according to a message format that can be identified by the peer system, an operation request against the peripheral device managed by the peer system, triggers, by using the generated operation request, a peripheral device identified by the identifier information of the peripheral device included in the operation request to perform an operation, and stores a feedback message in the first memory after the operation is complete.

Step S105: The local system acquires a feedback message of the request message.

The feedback message includes a parameter necessary to generate an execution result of the operation request.

The parameter necessary to generate the execution result of the operation request includes at least the identifier information of the peripheral device and operation result data. It should be noted that a format of the feedback message is the same as the format of the request message and is as follows:

| Device name | Device ID | Requested content | Request/Response information | Operation result data | Check information |
| --- | --- | --- | --- | --- | --- |

The requested content in the feedback message may be the same as that in the request message, or may be null; the operation result data is operation result data corresponding to the target data in the request message. In addition, message type information in the feedback message is the same as that in the request message and is used to indicate a type of the message (a request message or a response message); the check message is used to check whether the message is a valid message.

Specifically, the local system reads the feedback message from the first memory.

Step S106: Parse, according to the parameter in the feedback message, the feedback message into a message format that can be locally identified by the local system.

Figure 3:
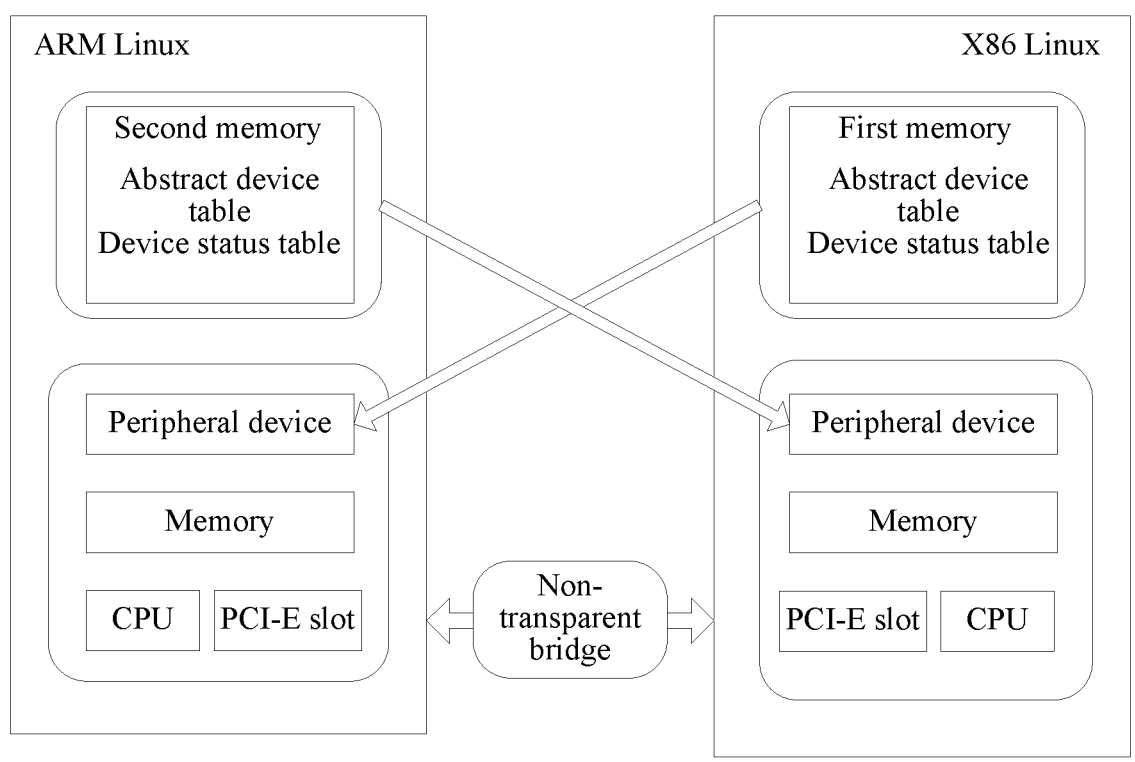
FIG. 3 is a schematic structural diagram of a specific example of a heterogeneous system.

FIG. 3 is a schematic structural diagram of a specific example of a heterogeneous system. Two systems in the heterogeneous system are connected by using a non-transparent bridge; and the two systems in the heterogeneous system have their own independent peripheral devices, processors, and memories, where a processor of one system is an X86 processor, and a processor of the other system is an ARM processor. In order to implement device sharing, the system in which the X86 processor is located may allocate, in its own memory, a first memory to the system in which the ARM processor is located, and the system in which the ARM processor is located allocates, in its own memory, a second memory to the system in which the X86 processor is located. The system in which the X86 processor is located may generate its own abstract device table and device status table and store its own abstract device table and device status table in the first memory when system initialization is performed. Likewise, the system in which the ARM processor is located may generate its own abstract device table and device status table when system initialization is performed. The system in which the ARM processor is located reads, from the first memory, the abstract device table and the device status table of the system in which the X86 processor is located, combines its own abstract device table with the abstract device table that is read from the first memory, combines its own device status table with the device status table that is read from the first memory, then extracts identifier information of a peripheral device from a combined abstract device table according to a combined device status table, generates, according to a message format that can be locally identified, an operation request against a peripheral device managed by the system in which the X86 processor is located, parses out, from the operation request, a request message including a parameter necessary to generate the operation request, stores, in the second memory, the request message that is parsed out, and notifies the system in which the X86 processor is located. The system in which the X86 processor is located extracts the request message from the second memory, generates, according to a format that can be identified by the system, an operation request to trigger a corresponding peripheral device to perform an operation, and stores an operation result in the first memory. The system in which the ARM processor is located reads and parses the operation result from the first memory.

According to the method for implementing device sharing provided in this embodiment of the present disclosure, after acquiring identifier information of a peripheral device of a peer system, a local system first generates, according to the identifier information of the peripheral device and according to a message format that can be locally identified, an operation request against the peripheral device managed by the peer system; because the operation request generated by the local system cannot be identified by the peer system, the local system parses out, from the operation request, a request message including a parameter necessary to generate the operation request, and notifies the peer system of the request message that is parsed out; and the peer system generates, according to the request message, an operation request in a message format that can be identified by the peer system, so as to trigger the peer system to operate its own peripheral device, thereby implementing an operation on the peripheral device of the peer system. It can be seen that according to the method for implementing device sharing provided in this embodiment of the present disclosure, two systems in a heterogeneous system not only can access a peripheral device of a local system, but also can access a peripheral device of a peer system, in other words, peripheral device sharing is implemented in the heterogeneous system.

In an actual application, a peripheral device of a heterogeneous system is idle in most of time and a resource is in an idle state. According to the method provided in this embodiment of the present disclosure, peripheral device sharing is implemented in the heterogeneous system, and the peripheral device is provided for a system that is in the heterogeneous system and that needs to use the peripheral device; therefore, utilization of the peripheral device can be improved and costs can be reduced.

When a local system accesses a peripheral device managed by a peer system, the peripheral device managed by the peer system may be idle or may be occupied (the peer system is accessing its own peripheral device). Based on this point, an embodiment of the present disclosure provides another method for implementing device sharing. Compared with the foregoing embodiment, a difference is as follows: a device status table in a first memory of the peer system not only includes identifier information of a peripheral device and device domain information, but also includes device use status information, where the device use status information is used to indicate whether the peripheral device is in an occupied state or in an idle state. In addition to including step S101 to step S105, before step S102 (The local system generates, according to the acquired identifier information of the peripheral device and according to a message format that can be locally identified, an operation request against the peripheral device managed by the peer system), the method for implementing device sharing provided in this embodiment of the present disclosure further includes: querying, by the local system, the device status table to query, by using the device use status information in the device status table, whether a state of the peripheral device managed by the peer system is the idle state; and step S102 (The local system generates, according to the acquired identifier information of the peripheral device and according to a message format that can be locally identified, an operation request against the peripheral device managed by the peer system) is specifically: when it is obtained, by querying, that the state of the peripheral device managed by the peer system is idleness, generating, by the local system, the operation request against the peripheral device managed by the peer system.

It should be noted that when a to-be-accessed peripheral device at a peer end is occupied, the local system waits and may query the device status table periodically in a waiting process; when obtaining, by querying, that device use status information of the to-be-accessed peripheral device is changed from occupancy to idleness, the local system acquires identifier information of the peripheral device and then generates, according to a message format that can be locally identified, an operation request against the peripheral device managed by the peer system.

In addition, it should be noted that in an actual application, a case in which a local system and a peer system have identical peripheral devices may exist. For example, the local system has a printer, and the peer system also has a printer; in this case, if the local system needs to execute a printing task and the printer of the local system is idle, based on the point of a simple and quick operation, a local printer may be used in preference for printing. In other words, when it is determined, by using the device status table, that a peripheral device at a local end is idle, a local peripheral device is accessed in preference; when the local peripheral device is occupied and a peripheral device at a peer end is idle, the peripheral device at the peer end is accessed.

If the local system stores, in a local memory, an abstract device table including information about all peripheral devices of the peer system, a particular memory overhead of the local system is consumed inevitably. In order to further reduce a memory overhead of the local system, a difference between this embodiment and the foregoing embodiment lies in that: after reading the abstract device table including the information about all the peripheral devices of the peer system, the peer system screens out information about an exclusive peripheral device of the peer system (specifically, device information of a peripheral device that the local system does not have) by comparing an abstract device table including information about all peripheral devices of the local system with the abstract device table including the information about all the peripheral devices of the peer system, so as to obtain an abstract device table including only the information about the exclusive peripheral device of the peer system, for the local system to use.

Figure 4:
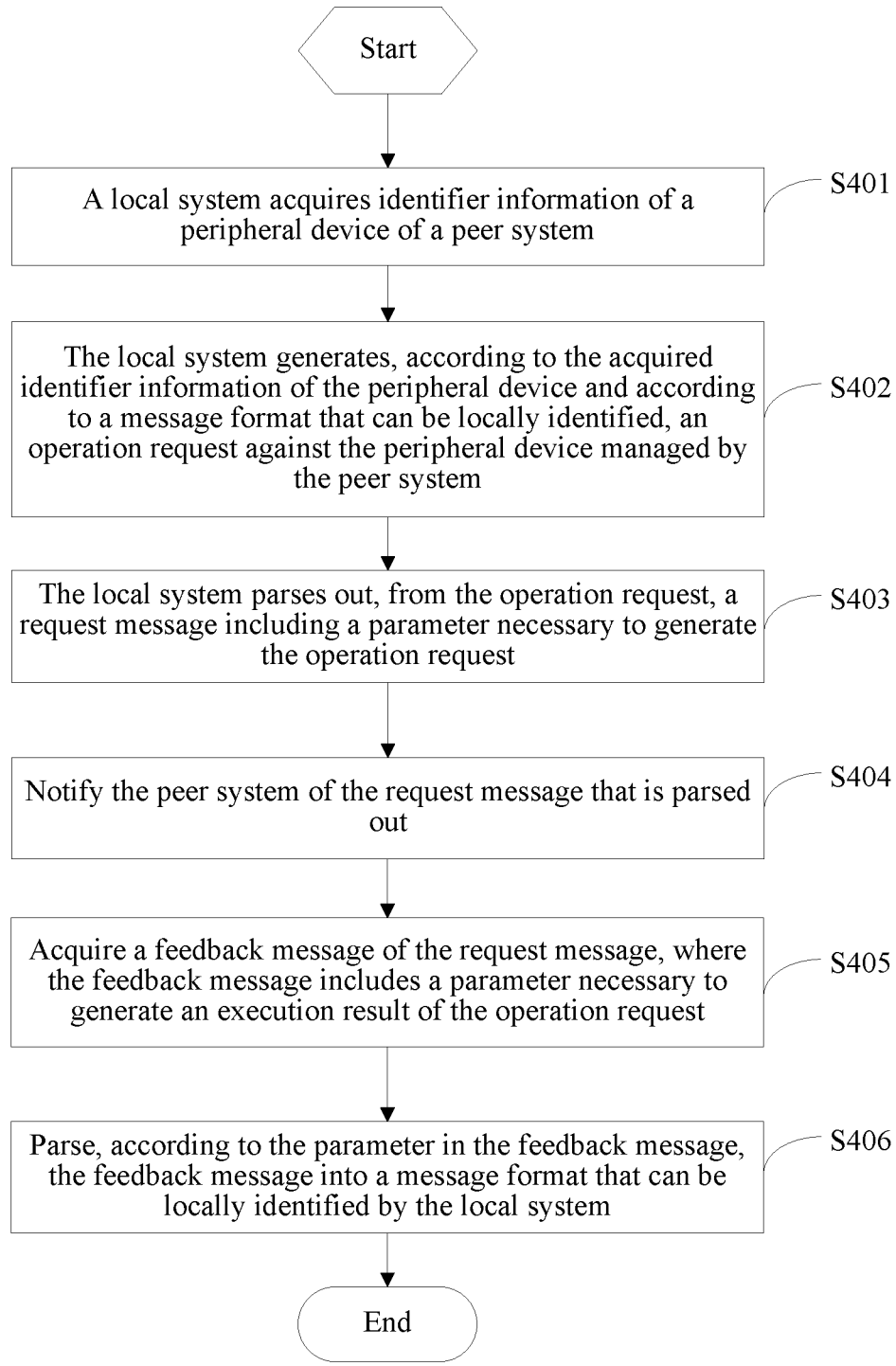
FIG. 4 is a schematic flowchart of another method for implementing device sharing according to an embodiment of the present disclosure.

Referring to FIG. 4, FIG. 4 is a schematic flowchart of another method for implementing device sharing according to an embodiment of the present disclosure, where the method is applied to a local system in a heterogeneous system that includes the local system and a peer system, the local system and the peer system have processors and peripheral devices that are independent from each other, a processor in the local system and a processor in the peer system use different instruction sets, and the method may include the following steps:

Step S401: The local system acquires identifier information of a peripheral device of the peer system.

The identifier information of the peripheral device may include a name of the peripheral device and a device ID of the peripheral device.

In this embodiment, a memory managed by the peer system includes a first memory shared with the local system, where an abstract device table including device information of the peripheral device managed by the peer system is prestored in the first memory. The device information of the peripheral device includes at least the identifier information of the peripheral device. The first memory is a memory allocated by the peer system to the local system, and the local system has a right to use the first memory. Because the local system has the right to use the first memory, the first memory is equivalent to a memory of the local system, and the local system can directly read information in the first memory.

For the abstract device table of the device information of the peripheral device managed by the peer system, in a possible implementation manner, the abstract device table may be set in a kernel mode of the peer system. Specifically, an operating system of the peer system imitates a sysfs file system to construct the abstract device table of the peer system in kernel space, or directly uses a created sysfs file system as the abstract device table of the peer system. In another possible implementation manner, the abstract device table of the device information of the peripheral device managed by the peer system may be set in a user mode of the peer system. Specifically, an operating system of the peer system imitates a sysfs file system to construct the abstract device table of the peer system in kernel space, or directly uses a created sysfs file system as the abstract device table of the peer system, and then places the abstract device table in the kernel mode to the user mode.

It should be noted that when the peer system starts or hot plugging for a device is performed on the peripheral device managed by the peer system, the abstract device table and a device status table in the first memory are updated.

Figure 5:
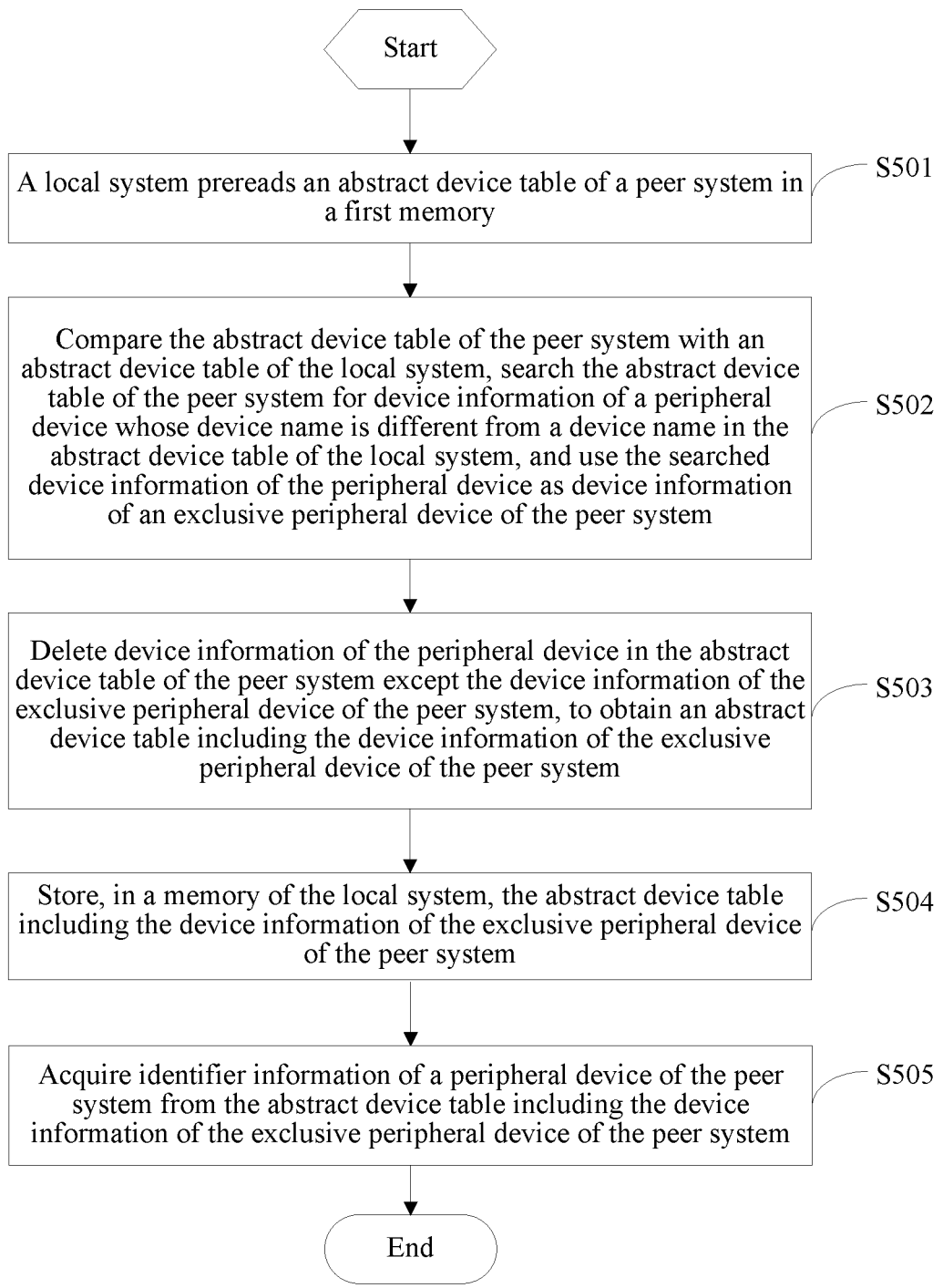
FIG. 5 is a schematic flowchart of another possible implementation manner, of acquiring identifier information of a peripheral device of a peer system by a local system, of a method for implementing device sharing according to an embodiment of the present disclosure.

Referring to FIG. 5, FIG. 5 is a schematic flowchart of a possible implementation manner, of acquiring the identifier information of the peripheral device of the peer system by the local system, of the method for implementing device sharing provided in this embodiment of the present disclosure, where the method may include the following steps:

Step S501: The local system prereads the abstract device table of the peer system in the first memory.

Step S502: Compare the abstract device table of the peer system with an abstract device table of the local system, search the abstract device table of the peer system for device information of a peripheral device whose device name is different from a device name in the abstract device table of the local system, and use the searched device information of the peripheral device as device information of an exclusive peripheral device of the peer system.

Step S503: Delete device information of the peripheral device in the abstract device table of the peer system except the device information of the exclusive peripheral device of the peer system, to obtain an abstract device table including the device information of the exclusive peripheral device of the peer system.

Step S504: Store, in a memory of the local system, the abstract device table including the device information of the exclusive peripheral device of the peer system.

Step S505: Acquire the identifier information of the peripheral device of the peer system from the abstract device table including the device information of the exclusive peripheral device of the peer system.

After the identifier information of the peripheral device of the peer system is acquired, return to the procedure of the method for implementing device sharing.

Step S402: The local system generates, according to the acquired identifier information of the peripheral device and according to a message format that can be locally identified, an operation request against the peripheral device managed by the peer system.

Step S403: The local system parses out, from the operation request, a request message including a parameter necessary to generate the operation request.

Step S404: Notify the peer system of the request message that is parsed out.

Step S405: Acquire a feedback message of the request message, where the feedback message includes a parameter necessary to generate an execution result of the operation request.

Step S406: Parse, according to the parameter in the feedback message, the feedback message into a message format that can be locally identified by the local system.

It should be noted that specific implementation manners of step S402 to step S405 is the same as those of step S102 to step S105 in the foregoing embodiment, and details are not described herein again.

According to the method for implementing device sharing provided in the present disclosure, after acquiring identifier information of a peripheral device of a peer system, a local system first generates, according to the identifier information of the peripheral device and according to a message format that can be locally identified, an operation request against the peripheral device managed by the peer system; because the operation request generated by a local end cannot be identified by a peer end, the local system parses out, from the operation request, a request message including a parameter necessary to generate the operation request, and notifies the peer system of the request message that is parsed out; and the peer system generates, according to the request message, an operation request in a message format that can be identified by the peer system, so as to trigger the peer system to operate its own peripheral device, thereby implementing an operation on the peripheral device of the peer system. It can be seen that according to the method and the apparatus for implementing device sharing provided in this embodiment of the present disclosure, two systems in a heterogeneous system not only can access a peripheral device of a local system, but also can access a peripheral device of a peer system, in other words, peripheral device sharing is implemented in the heterogeneous system. In addition, the local system stores only an abstract device table including device information of an exclusive peripheral device of the peer system, so as to reduce a memory overhead of the local system.

In an actual application, a peripheral device of a heterogeneous system is idle in most of time and a resource is in an idle state. According to the method provided in this embodiment of the present disclosure, peripheral device sharing is implemented in the heterogeneous system, and the peripheral device is provided for a system that is in the heterogeneous system and that needs to use the peripheral device; therefore, utilization of the peripheral device can be improved and costs can be reduced.

Figure 6:
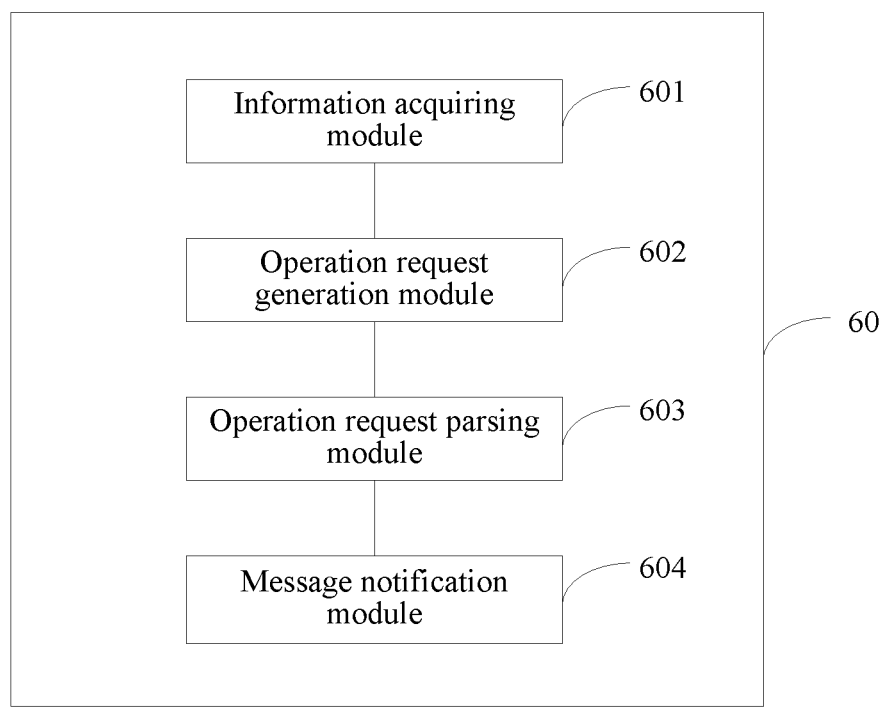
FIG. 6 is a schematic structural diagram of an apparatus 60 for implementing device sharing according to an embodiment of the present disclosure.

Referring to FIG. 6, FIG. 6 is a schematic structural diagram of an apparatus 60 for implementing device sharing according to an embodiment of the present disclosure, where the apparatus 60 is applied to a local system in a heterogeneous system that includes the local system and a peer system, the local system and the peer system have processors and peripheral devices that are independent from each other, a processor in the local system and a processor in the peer system use different instruction sets, and the apparatus

60 may include an information acquiring module 601, an operation request generation module 602, an operation request parsing module 603, and a message notification module 604.

The information acquiring module 601 is configured to acquire identifier information of a peripheral device of the peer system.

The operation request generation module 602 is configured to generate, according to the identifier information of the peripheral device acquired by the information acquiring module 601 and according to a message format that can be locally identified, an operation request against the peripheral device managed by the peer system.

The operation request parsing module 603 is configured to parse out, from the operation request generated by the operation request generation module 602, a request message including a parameter necessary to generate the operation request.

The parameter necessary to generate the operation request includes at least the identifier information of the peripheral device, target data, and requested content, where the target data is to-be-operated data corresponding to the peripheral device identified by the identifier information of the peripheral device, and the requested content is used to indicate an operation performed on the target data.

The message notification module 604 is configured to notify the peer system of the request message that is parsed out by the operation request parsing module 603.

According to the apparatus for implementing device sharing provided in the present disclosure, after identifier information of a peripheral device of a peer system is acquired, an operation request against the peripheral device managed by the peer system is first generated according to the identifier information of the peripheral device and according to a message format that can be locally identified; because the operation request generated by a local end cannot be identified by a peer end, a request message including a parameter necessary to generate the operation request is parsed out from the operation request, and the peer system is notified of the request message that is parsed out; and the peer system generates, according to the request message, an operation request in a message format that can be identified by the peer system, so as to trigger the peer system to operate its own peripheral device, thereby implementing an operation on a peer device. It can be seen that according to the apparatus for implementing device sharing provided in this embodiment of the present disclosure, two systems in a heterogeneous system not only can access a peripheral device of a local system, but also can access a peripheral device of a peer system, in other words, peripheral device sharing is implemented in the heterogeneous system.

In an actual application, a peripheral device of a heterogeneous system is idle in most of time and a resource is in an idle state. According to the apparatus provided in this embodiment of the present disclosure, peripheral device sharing is implemented in the heterogeneous system, and the peripheral device is provided for a system that is in the heterogeneous system and that needs to use the peripheral device; therefore, utilization of the peripheral device can be improved and costs can be reduced.

Figure 7:
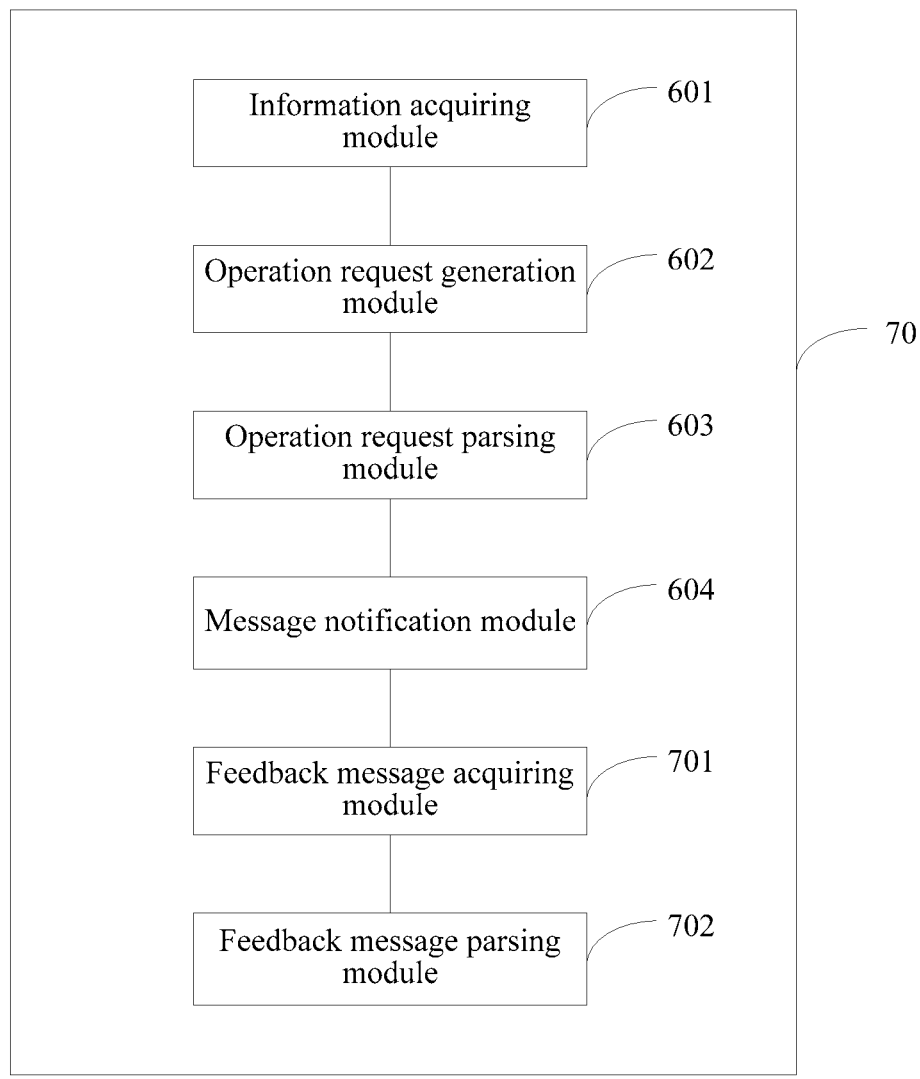
FIG. 7 is a schematic structural diagram of another apparatus 70 for implementing device sharing according to an embodiment of the present disclosure.

Referring to FIG. 7, FIG. 7 is a schematic structural diagram of another apparatus 70 for implementing device sharing according to an embodiment of the present disclosure. Compared with the apparatus provided in the foregoing embodiment, in this embodiment of the present disclosure, a difference is as follows: in addition to including an information acquiring module 601, an operation request generation module 602, an operation request parsing module 603, and a message notification module 604, the apparatus 70 further includes a feedback message acquiring module 701 and a feedback message parsing module 702.

The feedback message acquiring module 701 is configured to acquire a feedback message of the request message, where the feedback message includes a parameter necessary to generate an execution result of the operation request.

The parameter necessary to generate the execution result of the operation request includes at least the identifier information of the peripheral device and operation result data corresponding to target data in the request message.

The feedback message parsing module 702 is configured to parse, according to the parameter in the feedback message, the feedback message into a message format that can be locally identified by a local system.

Figure 8:
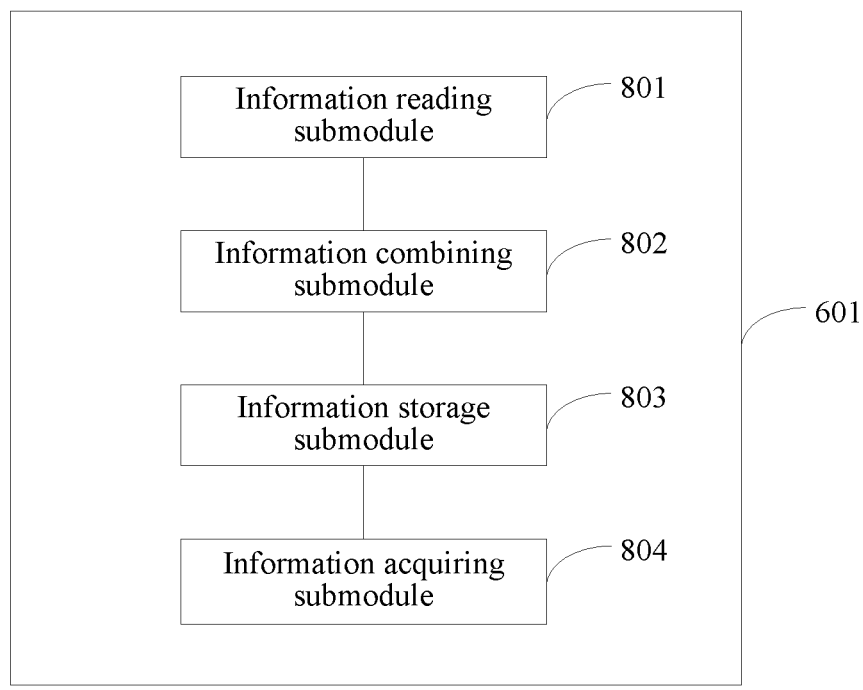
FIG. 8 is a schematic structural diagram of an information acquiring module 601 of an apparatus for implementing device sharing according to an embodiment of the present disclosure.

In a possible implementation manner, a memory managed by the peer system includes a first memory shared with the local system, where an abstract device table including device information of the peripheral device managed by the peer system and a device status table including device domain information of the peripheral device managed by the peer system are prestored in the first memory. In this case, referring to FIG. 8, FIG. 8 is a schematic structural diagram of the information acquiring module 601 in the apparatuses 60 and 70 for implementing device sharing according to the foregoing embodiments, where the information acquiring module 601 may include an information reading submodule 801, an information combining submodule 802, an information storage submodule 803, and an information acquiring submodule 804.

The information reading submodule 801 is configured to preread the abstract device table and the device status table of the peer system that are in the first memory.

The information combining submodule 802 is configured to combine the abstract device table, read by the information reading submodule 801, of a peer device with an abstract device table of the local system, and combine the device status table, read by the information reading submodule 801, of the peer device with a device status table of the local system.

The information storage submodule 803 is configured to store a combined abstract device table and a combined device status table that are of the information combining submodule 802 in a memory of the local system.

The information acquiring submodule 804 is configured to acquire the identifier information of the peripheral device of the peer system from the combined abstract device table according to device domain information in the combined device status table stored by the information storage submodule 803.

The device status table may further include device use status information, where the device use status information is used to indicate whether the peripheral device in the abstract device table is in an idle state or in an occupied state. The apparatus provided in the foregoing embodiment may further include a status query module.

The status query module is configured to: before the operation request generation module 602 generates, according to the identifier information of the peripheral device acquired by the information acquiring module 601 and according to the message format that can be locally identified, the operation request against the peripheral device managed by the peer system, query the device status table to query whether a state of the peripheral device managed by the peer system is idleness. The operation request generation module 602 is specifically configured to: when it is queried that the state of the peripheral device managed by the peer system is idleness, generate, by the local system, the operation request against the peripheral device managed by the peer system.

Figure 9:
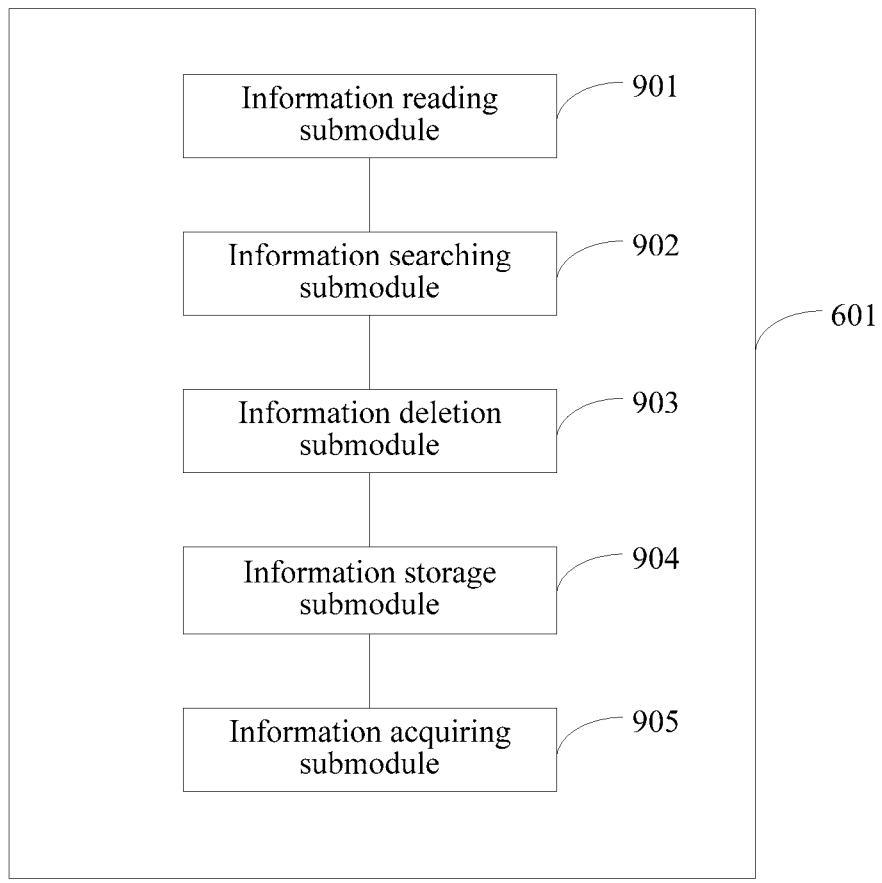
FIG. 9 is a schematic structural diagram of an information acquiring module 601 of an apparatus for implementing device sharing according to an embodiment of the present disclosure.

In another possible implementation manner, a memory managed by the peer system includes a first memory shared with the local system, where an abstract device table including device information of the peripheral device managed by the peer system is prestored in the first memory, the device information of the peripheral device includes at least the identifier information of the peripheral device, and the identifier information of the peripheral device includes at least a device name of the peripheral device. In this case, referring to FIG. 9, FIG. 9 is another schematic structural diagram of the information acquiring module 601 in the apparatuses 60 and 70 for implementing device sharing according to the foregoing embodiments, where the information acquiring module 601 may include an information reading submodule 901, an information searching submodule 902, an information deletion submodule 903, an information storing submodule 904, and an information acquiring submodule 905.

The information reading submodule 901 is configured to read the abstract device table of the peer system in the first memory.

The information searching submodule 902 is configured to compare the abstract device table of the peer system with an abstract device table of the local system, search the abstract device table of the peer system for device information of a peripheral device whose device name is different from a device name in the abstract device table of the local system, and use the searched device information of the peripheral device as device information of an exclusive peripheral device of the peer system.

The information deletion submodule 903 is configured to delete device information of the peripheral device in the abstract device table of the peer system except the device information of the exclusive peripheral device of the peer system, to obtain an abstract device table including the device information of the exclusive peripheral device of the peer system.

The information storage submodule 904 is configured to store, in a memory of the local system, the abstract device table including the device information of the exclusive peripheral device of the peer system.

The information acquiring submodule 905 is configured to acquire the identifier information of the peripheral device of the peer system from the abstract device table including the device information of the exclusive peripheral device of the peer system.

Further, the feedback message acquiring module 701 in the foregoing embodiment is specifically configured to acquire the feedback message of the request message from the first memory of the peer system.

The memory managed by the local system includes a second memory shared with the peer system. In a possible implementation manner, the message notification module 604 is specifically configured to: store, in the second memory, the request message that is parsed out, and send, to the peer system, a request for reading the request message, so that the peer system reads the request message from the second memory.

In another possible implementation manner, the message notification module 604 is specifically configured to store, in the second memory, the request message that is parsed out, so that the peer system discovers the request message in a manner of polling the second memory and reads the request message from the second memory after discovering the request message.

It should be noted that the abstract device table in the foregoing embodiment may be set in a user mode of the peer system, or may be set in a kernel mode of the peer system.

Figure 10:
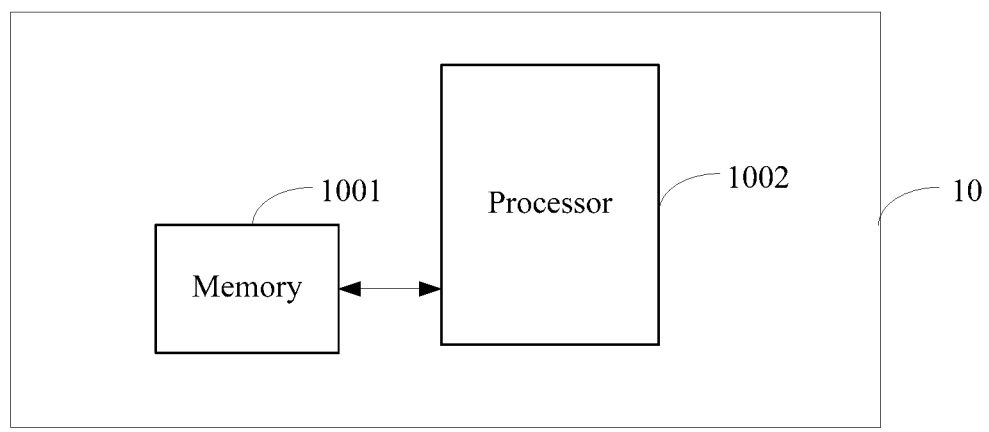
FIG. 10 is a schematic structural diagram of a shared device 10 according to an embodiment of the present disclosure.

An embodiment of the present disclosure further provides a shared device, where the shared device is applied to a local system in a heterogeneous system that includes the local system and a peer system, the local system and the peer system have peripheral devices that are independent from each other, and the shared device may be configured to execute the method in any one of the foregoing embodiments. Referring to FIG. 10, FIG. 10 is a schematic structural diagram of the shared device according to this embodiment of the present disclosure.

The terminal may be a terminal device such as a server, a tablet computer, a PDA (personal digital assistant), a POS (point of sales), or a vehicle-mounted computer. FIG. 10 is a block diagram of a part of a structure of the shared device. Referring to FIG. 10, the shared device includes components such as a memory 1001 and a processor 1002.

The memory 1001 may be configured to store a software program and module. The processor 1002 executes various functional applications of the shared device and performs data processing by running the software program and module that are stored in the memory 1001. The memory 1001 may mainly include a program storage area and a data storage area, where the program storage area may store an operating system, an application program required by at least one function (for example, a voice playback function and an image playback function), and the like; and the data storage area may store data (for example, audio data and a phone book) created according to use of a server, and the like. In addition, the memory 1001 may include a high-speed random access memory, and may further include a non-volatile memory, for example, at least one magnetic disk storage component, a flash memory component, or another volatile solid-state storage component.

The processor 1002 is a control center of the shared device, is connected to various parts of the entire server by using various interfaces and lines, and executes various functions of the shared device and processes data by running or executing the software program and/or module stored in the memory 1001 and invoking data stored in the memory 1001, so as to monitor the entire shared device. Optionally, the processor 1002 may include one or more processing units. Preferably, the processor 1002 may integrate an application processor and a modem processor, where the application processor mainly processes an operating system, a user interface, an application program, and the like, and the modem processor mainly processes radio communication. It should be understood that the modem processor may also not be integrated in the processor 1002.

In this embodiment of the present disclosure, the processor 1002 included in the shared device has the following functions:

acquiring identifier information of a peripheral device of the peer system; generating, according to the acquired identifier information of the peripheral device and according to a message format that can be locally identified, an operation request against the peripheral device managed by the peer system; parsing out, from the operation request, a request message including a parameter necessary to generate the operation request; and notifying the peer system of the request message that is parsed out.

The functions of the processor 1002 further include: acquiring a feedback message of the request message, where the feedback message includes a parameter necessary to generate an execution result of the operation request; and parsing, according to the parameter in the feedback message, the feedback message into a message format that can be locally identified by the local system.

The embodiments in this specification are all described in a progressive manner, for same or similar parts in the embodiments, reference may be made to these embodiments, and each embodiment focuses on a difference from other embodiments. The apparatus disclosed in the embodiment is basically similar to the method disclosed in the embodiment, and therefore is described briefly; for related parts, reference may be made to partial descriptions of the method.

Finally, it should be noted that in this specification, relational terms such as first and second are only used to distinguish one entity or operation from another, and do not necessarily require or imply that any actual relationship or sequence exists between these entities or operations. Moreover, the terms "include", "comprise", or their any other variant is intended to cover a non-exclusive inclusion, so that a process, a method, an article, or a device that includes a list of elements not only includes those elements but also includes other elements that are not expressly listed, or further includes elements inherent to such a process, method, article, or device. An element preceded by "includes a . . . " does not, without more constraints, preclude the presence of additional identical elements in the process, method, article, or device that includes the element.

For ease of description, the foregoing apparatus is described by dividing functions into various units. Certainly, during implementation of the present application, the functions of each unit may be implemented in a same piece of or a plurality of pieces of software and/or hardware.

Based on the foregoing descriptions of the implementation manners, a person skilled in the art may clearly understand that the present application may be implemented by software in addition to a necessary general hardware platform. Based on such an understanding, the technical solutions of the present application essentially or the part contributing to the prior art may be implemented in a form of a software product. The computer software product may be stored in a storage medium, such as a ROM/RAM, a magnetic disk, or an optical disc, and includes several instructions for instructing a computer device (which may be a personal computer, a server, or a network device) to perform the methods described in the embodiments or some parts of the embodiments of the present application.

The embodiments disclosed above are described to enable a person skilled in the art to implement or use the present disclosure. Various modifications to the embodiments are obvious to the person skilled in the art, and general principles defined in this specification may be implemented in other embodiments without departing from the spirit or scope of the present disclosure. Therefore, the present disclosure will not be limited to the embodiments described in this specification but extends to the widest scope that complies with the principles and novelty disclosed in this specification.

What is claimed is:

1. A method for implementing device sharing, the method comprising:

acquiring, by a local system, identifier information of a peripheral device, wherein the peripheral device is comprised in a peer system, and one of the local and peer systems includes an X86 processor and the other system includes an ARM processor;

generating, by the local system, an operation request against the peripheral device according to the acquired identifier information of the peripheral device and according to a locally identifiable message format, wherein the operation request is unidentifiable for the peer system;

parsing out, by the local system, a parameter from the operation request, wherein the parameter comprises the identifier information of the peripheral device, target data, and requested content, and wherein the requested content indicates an operation to be performed on the target data;

generating a request message comprising the parameter; and sending the request message to the peer system.

2. The method according to claim 1, further comprising:

acquiring a feedback message of the request message, wherein the feedback message comprises a parameter associated with an execution result of the operation request; and parsing, according to the parameter in the feedback message, the feedback message into a message format that is locally identifiable by the local system.

3. The method according to claim 2, wherein a memory managed by the peer system comprises a first memory shared with the local system, wherein an abstract device table comprising device information of the peripheral device and a device status table comprising device domain information of the peripheral device are prestored in the first memory; and wherein acquiring the identifier information of the peripheral device comprises:

prereading, by the local system, the abstract device table and the device status table of the peer system from the first memory;

combining the abstract device table from the first memory with an abstract device table of the local system, and combining the device status table from the first memory with a device status table of the local system;

storing a combined abstract device table and a combined device status table in a memory of the local system; and acquiring the identifier information of the peripheral device from the combined abstract device table according to device domain information in the combined device status table.

4. The method according to claim 2, wherein a memory managed by the peer system comprises a first memory shared with the local system, wherein an abstract device table comprising device information of the peripheral device is prestored in the first memory, the device information of the peripheral device comprises the identifier information of the peripheral device, and the identifier information of the peripheral device comprises a device name of the peripheral device; and wherein acquiring the identifier information of the peripheral device comprises:

prereading, by the local system, the abstract device table of the peer system from the first memory;

comparing the abstract device table of the peer system with an abstract device table of the local system, searching the abstract device table of the peer system for device information of a peripheral device whose device name is different from a device name in the abstract device table of the local system, and using the searched device information as device information of an exclusive peripheral device of the peer system;

deleting device information in the abstract device table of the peer system except the device information of the exclusive peripheral device of the peer system, to obtain an abstract device table comprising the device information of the exclusive peripheral device of the peer system;

storing the abstract device table comprising the device information of the exclusive peripheral device of the peer system; and acquiring the identifier information of the peripheral device from the abstract device table comprising the device information of the exclusive peripheral device of the peer system.

5. The method according to claim 3, wherein acquiring the feedback message of the request message comprises:

acquiring the feedback message of the request message from the first memory.

6. The method according to claim 3, wherein the device status table further comprises device use status information, wherein the device use status information indicates whether the peripheral device in the abstract device table is in an idle state or in an occupied state;

wherein before generating the operation request against the peripheral device, the method further comprises: querying, by the local system, the device status table to query whether a state of the peripheral device is idleness; and wherein generating the operation request against the peripheral device comprises: based on the state of the peripheral device being idleness, generating, by the local system, the operation request against the peripheral device.

7. The method according to claim 1, wherein a memory managed by the local system comprises a second memory shared with the peer system; and wherein sending the request message to the peer system comprises:

storing, in the second memory, by the local system, the request message; and sending, to the peer system, a request for reading the request message to facilitate the peer system reading the request message from the second memory.

8. The method according to claim 1, wherein a memory managed by the local system comprises a second memory shared with the peer system; and wherein sending the request message to the peer system comprises:

storing, in the second memory, by the local system, the request message to facilitate the peer system discovering the request message in a manner of polling the second memory and reading the request message from the second memory after discovering the request message.

9. The method according to claim 3, wherein the abstract device table is set in a user mode of the peer system.

10. The method according to claim 2, wherein the parameter in the operation request comprises the identifier information of the peripheral device, target data, and requested content, wherein the target data is to-be-operated data corresponding to the peripheral device identified by the identifier information of the peripheral device, and the requested content indicates an operation to be performed on the target data; and wherein the parameter associated with the execution result of the operation request comprises the identifier information of the peripheral device and operation result data corresponding to the target data.

11. A shared device for a local system in a heterogeneous system that comprises the local system and a peer system, wherein one of the local and peer systems includes an X86 processor and the other system includes an ARM processor, and the peer system has a peripheral device, and wherein the shared device comprises:

a memory having processor-executable instructions stored thereon; and a processor configured to execute the processor-executable instructions to facilitate:

acquiring identifier information of the peripheral device;

generating, according to the identifier information of the peripheral device and according to a locally identifiable message format, an operation request against the peripheral device, wherein the operation request is unidentifiable for the peer system;

parsing out a parameter from the operation request, wherein the parameter comprises the identifier information of the peripheral device, target data, and requested content, and wherein the requested content indicates an operation to be performed on the target data;

generating a request message comprising the parameter; and sending the request message to the peer system.

12. The shared device according to claim 11, wherein the processor is further configured to execute the processor-executable instructions to facilitate:

acquiring a feedback message of the request message, wherein the feedback message comprises a parameter associated with an execution result of the operation request; and parsing, according to the parameter in the feedback message, the feedback message into a message format that is locally identifiable by the local system.

13. The shared device according to claim 12, wherein a memory managed by the peer system comprises a first memory shared with the local system, wherein an abstract device table comprising device information of the peripheral device and a device status table comprising device domain information of the peripheral device are prestored in the first memory; and wherein the processor is further configured to execute the processor-executable instructions to facilitate:

prereading the abstract device table and the device status table of the peer system from the first memory;

combining the abstract device table from the first memory with an abstract device table of the local system, and combining the device status table from the first memory with a device status table of the local system;

storing a combined abstract device table and a combined device status table in a memory of the local system; and acquiring the identifier information of the peripheral device from the combined abstract device table according to device domain information in the combined device status table.

14. The shared device according to claim 12, wherein a memory managed by the peer system comprises a first memory shared with the local system, wherein an abstract device table comprising device information of the peripheral device is prestored in the first memory, the device information of the peripheral device comprises the identifier information of the peripheral device, and the identifier information of the peripheral device comprises a device name of the peripheral device; and wherein the processor is further configured to execute the processor-executable instructions to facilitate:

reading the abstract device table of the peer system from the first memory;

comparing the abstract device table of the peer system with an abstract device table of the local system, searching the abstract device table from the first memory for device information of a peripheral device whose device name is different from a device name in the abstract device table of the local system, and using the searched device information as device information of an exclusive peripheral device of the peer system;

deleting device information in the abstract device table of the peer system except the device information of the exclusive peripheral device of the peer system, to obtain an abstract device table comprising the device information of the exclusive peripheral device of the peer system;

storing the abstract device table comprising the device information of the exclusive peripheral device of the peer system; and acquiring the identifier information of the peripheral device from the abstract device table comprising the device information of the exclusive peripheral device of the peer system.

15. The shared device according to claim 13, wherein the processor is further configured to execute the processor-executable instructions to facilitate: acquiring the feedback message of the request message from the first memory.

16. The shared device according to claim 13, wherein the device status table further comprises device use status information, wherein the device use status information indicates whether the peripheral device in the abstract device table is in an idle state or in an occupied state;

wherein the processor is further configured to execute the processor-executable instructions to facilitate:

before generating the operation request against the peripheral device, querying the device status table to query whether a state of the peripheral device is idleness; and based on the state of the peripheral device being idleness, generating the operation request against the peripheral device.

17. The shared device according to claim 11, wherein a memory managed by the local system comprises a second memory shared with the peer system; and wherein the processor is further configured to execute the processor-executable instructions to facilitate:

storing, in the second memory, the request message, and sending, to the peer system, a request for reading the request message to facilitate the peer system reading the request message from the second memory.

18. The shared device according to claim 11, wherein a memory managed by the local system comprises a second memory shared with the peer system; and wherein the processor is further configured to execute the processor-executable instructions to facilitate:

storing, in the second memory, the request message to facilitate the peer system discovering the request message in a manner of polling the second memory and reading the request message from the second memory after discovering the request message.

19. The shared device according to claim 13, wherein the abstract device table is set in a user mode of the peer system.

20. The shared device according to claim 12, wherein the parameter in the operation request comprises the identifier information of the peripheral device, target data, and requested content, wherein the target data is to-be-operated data corresponding to the peripheral device identified by the identifier information of the peripheral device, and the requested content indicates an operation to be performed on the target data; and wherein the parameter associated with the execution result of the operation request comprises the identifier information of the peripheral device and operation result data corresponding to the target data.

* * * * *